March 13, 1928.
H. A. WELLS
1,662,770
CUSHION TIRE FOR WHEELS
Filed April 12, 1927
2 Sheets-Sheet 1
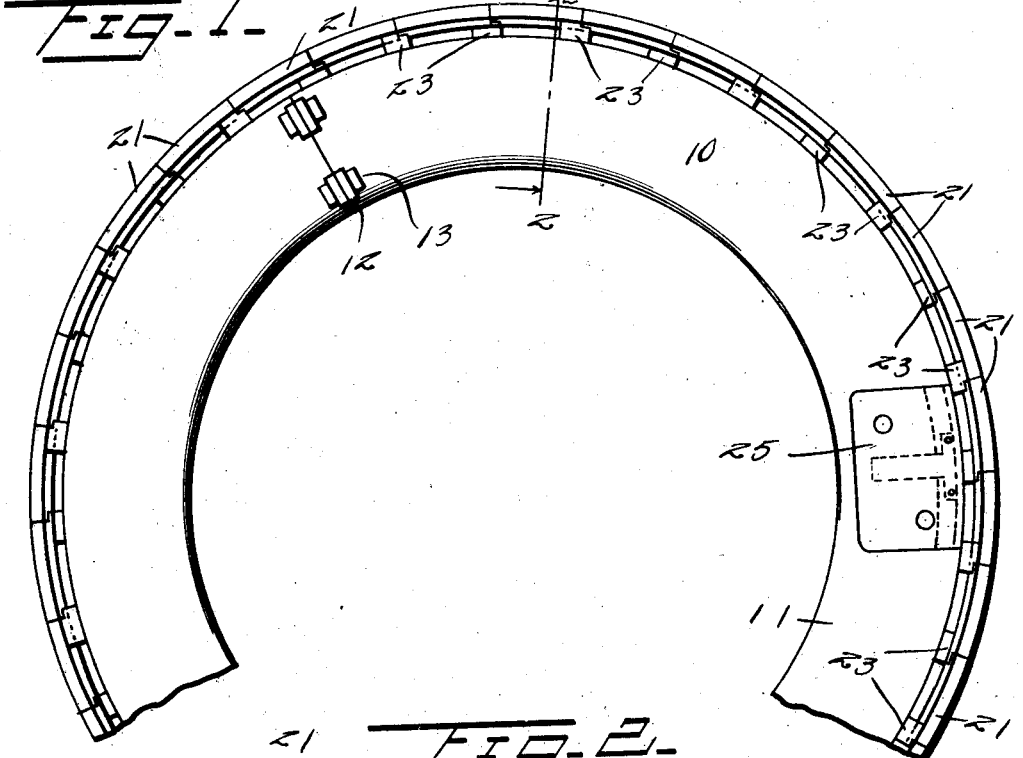
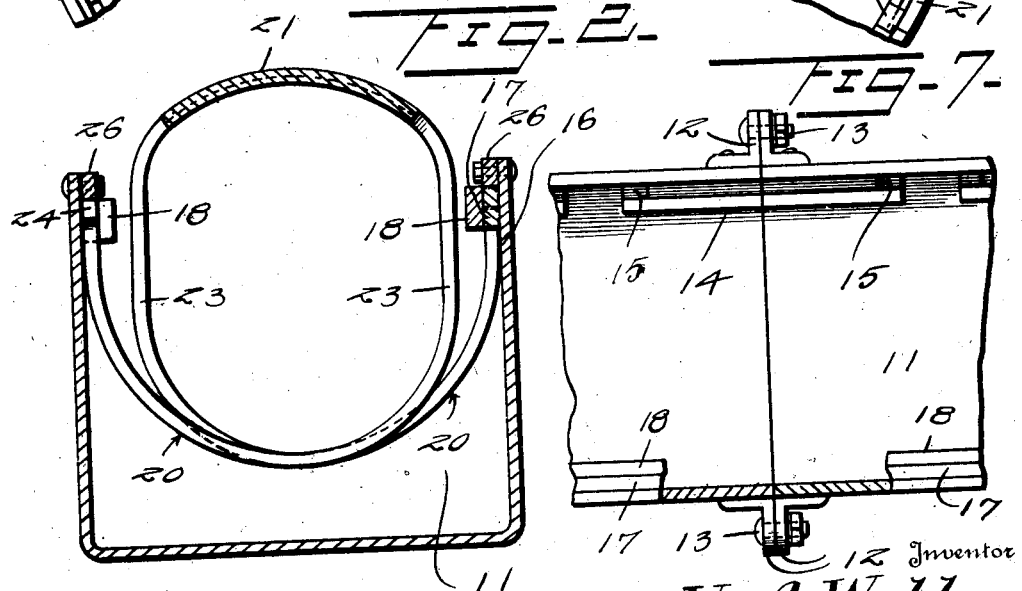
Inventor
H. A. Wells
By Watson E. Coleman
Attorney March 13, 1928.
H. A. WELLS
CUSHION TIRE FOR WHEELS
Filed April 12, 1927    2 Sheets-Sheet 2
1,662,770
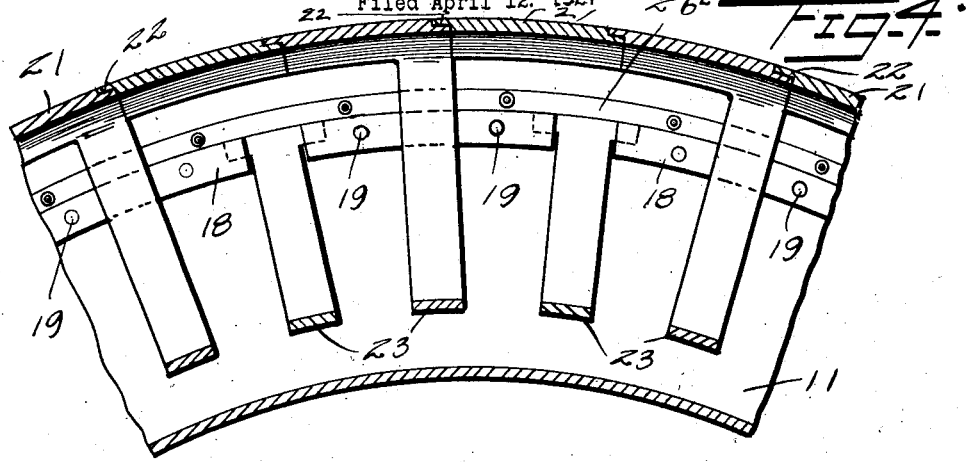
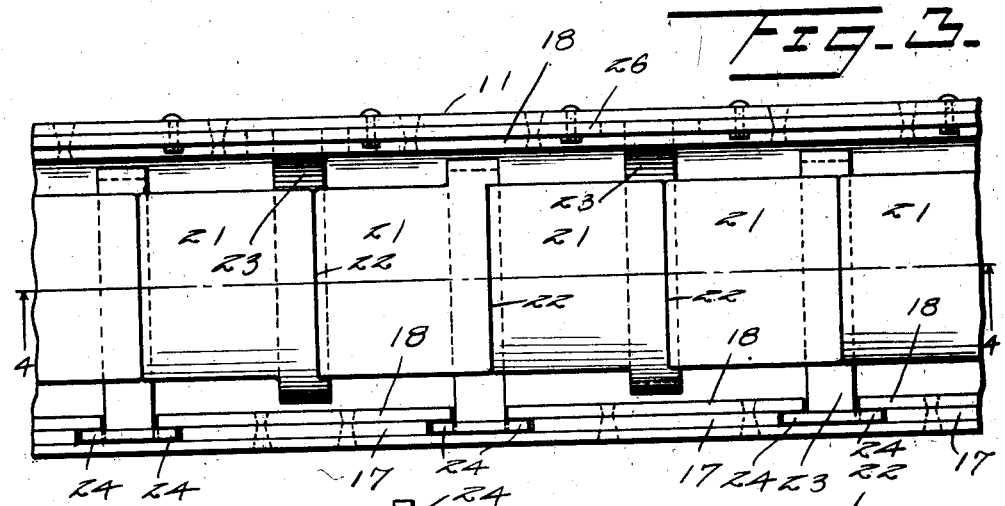
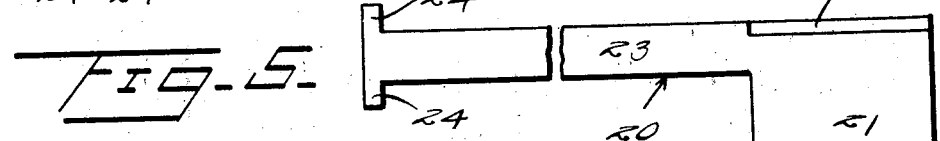
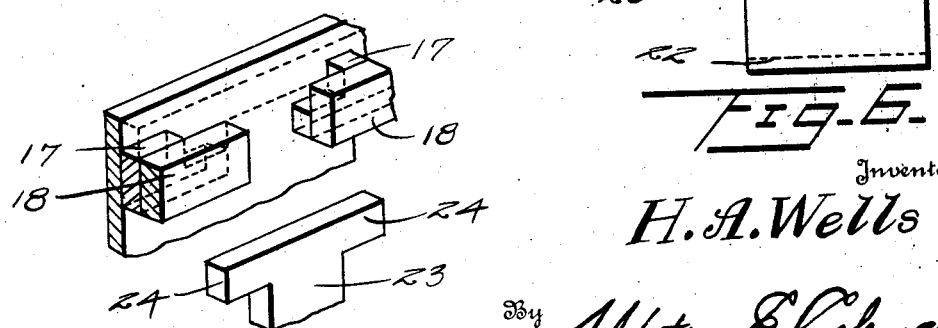
Inventor
H. A. Wells
By Watson E. Coleman
Attorney Patented Mar. 13, 1928.

1,662,770

UNITED STATES PATENT OFFICE.

HOMER A. WELLS, OF RICO, COLORADO.

CUSHION TIRE FOR WHEELS.

Application filed April 12, 1927. Serial No. 183,112.

This invention relates to cushion tires for wheels and more particularly to a structure of this character which is entirely formed from metal.

An important object of the invention is to produce a device of this character which may be very readily assembled and the elements of which may be very readily replaced in event they become worn or broken in service.

A further object of the invention is to provide a device of this character including a plurality of spring supported plates, which are independently movable and which combine to provide a substantially continuous tread for the tire.

A still further object of the invention is to provide a structure of this character, wherein the supports for the plates may be integrally formed therewith and form the supporting springs thereof.

These and other objects I attain by the construction shown in the accompanying drawings, wherein for the purpose of illustration is shown a preferred embodiment of my invention and wherein:—

Figure 1 is a fragmentary side elevation of a tire constructed in accordance with my invention;

Figure 2 is an enlarged section on the line 2—2 of Figure 1;

Figure 3 is a fragmentary plan view of the tire one of the securing elements being omitted to clarify the illustration;

Figure 4 is a section on the line 4—4 of Figure 3;

Figure 5 is a fragmentary perspective illustrating the manner of forming the sockets for the heads of the plate springs, the ring for retaining these elements in position being illustrated in dotted lines;

Figure 6 is a plan of the blank from which the plate and its supporting spring are produced;

Figure 7 is a fragmentary plan partially broken away of the tire channel with the plates and their supporting springs removed.

Referring now more particularly to the drawings, the numeral 10 generally designates an annular member having an outwardly directed channel 11. This annular member may be formed in a plurality of sections, abutting ends of which are provided with apertured ears 12 for the reception of securing bolts 13. Each side wall of the channel is formed with a ledge consisting of circumferentially spaced sections 14, adjacent its outer edge, and adjacent ends of these sections are provided with recesses 15 in their outer surfaces, which are arranged adjacent the side wall 16, to which the sections are attached. In the present instance, the ledge is disclosed as formed by employing inner and outer plates 17 and 18, the inner plate being notched at its outer corners to provide the recesses 15. These plates are secured to the wall by rivets 19.

A plurality of combined tread plates and springs are provided, as generally indicated at 20. These elements each include plates 21, opposite edges of which are oppositely rabbetted, as at 22, so that the plates may combine to form a ciphered annulus. Extending from one longitudinal edge of the plate and having one of its side edges aligning with one of the transverse edges of the plate is an elongated narrow neck 23. This neck, which, together with the plate is formed from spring steel, is bent in a substantially C-form with the terminal portion thereof substantially perpendicular to the plate. This terminal portion is provided with transversely projecting ears 24, which combine therewith to provide a head and seat in the recesses 15. The spaces between the sections 14 at opposite walls of the channel are staggered with relation to one another and the neck portions 23 of adjacent plates are oppositely bent with relation to one another. In order to facilitate seating of the ears 24 in the recesses 15, in the assembly of the device, the side wall of the channel may be provided with a removable section 25, through which the last element may be seated. Retaining elements 26 are provided in the form of segments of an annulus, which will seat upon the outer surface of the ledge sections 14 and contact with the heads of the C-shaped springs to prevent disengagement of the lugs 24 therefrom.

It will be obvious that each plate provides its own mounting means and its own spring structure and that in event one of these elements becomes broken, this plate may be very readily replaced. It will also be obvious that the construction hereinbefore set forth is capable of a certain range of change and modification without materially departing from the spirit of the invention and I accordingly do not limit myself to such specific structure except as hereinafter claimed.

I claim:—

1. In a cushion tire for wheels, an annulus embodying spaced opposed walls, a plurality of plates combining to produce a ciphered annulus, each of said plates having a curved extension forming a spring whereby the plate is supported, the terminal portions of said springs being secured to one of confronting faces of the walls of the annulus.

2. In a cushion tire for wheels, an annulus embodying spaced opposed walls, a plurality of plates combining to produce a ciphered annulus, each of said plates having a curved extension forming a spring whereby the plate is supported, the terminal portions of said springs being secured to one of confronting faces of the walls of the annulus, the springs of alternate plates being secured to one of said walls, the springs of the remaining plates being secured to the opposite wall.

3. In a cushion tire for wheels, an annulus embodying spaced opposed walls, a plurality of plates combining to produce a ciphered annulus, each of said plates having a curved extension forming a spring whereby the plate is supported, the terminal portions of said springs being provided with heads, the confronting walls of said annulus being provided with ledges adjacent edges of which are recessed adjacent the wall to provide sockets for the reception of the sides of said heads and means for retaining said heads within the recesses.

4. In a cushion tire for wheels, an annulus embodying spaced opposed walls, a plurality of plates combining to produce a ciphered annulus, each of said plates having a curved extension forming a spring whereby the plate is supported, the terminal portions of said springs being provided with heads, the confronting walls of said annulus being provided with ledges adjacent edges of which are recessed adjacent the wall to provide sockets for the reception of the sides of said heads and means for returning said heads within the recesses, the ledges of one of said walls being staggered with relation to the ledges of the other wall, the springs of adjacent plates having their head portions disposed in recesses at opposite sides of said annulus.

In testimony whereof I hereunto affix my signature.

HOMER A. WELLS.